G. WEBB.
TIRE CARRYING RIM FOR VEHICLE WHEELS.
APPLICATION FILED NOV. 11, 1909.
997,877.
Patented July 11, 1911.
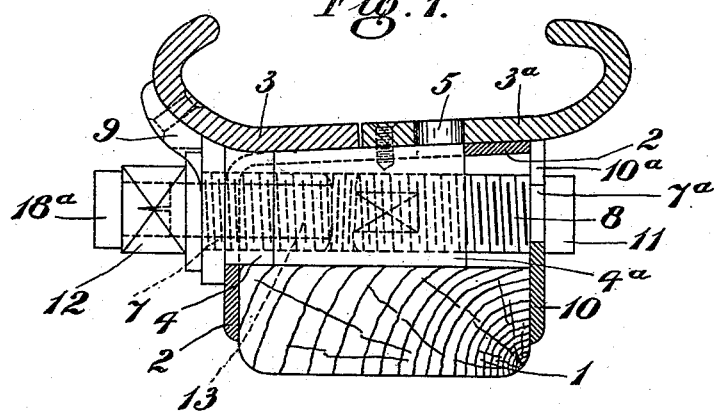
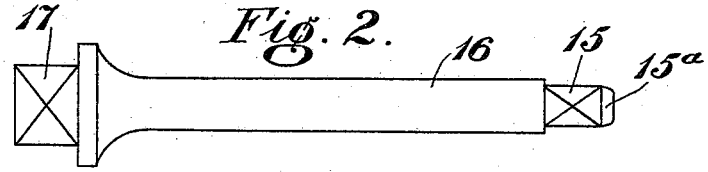
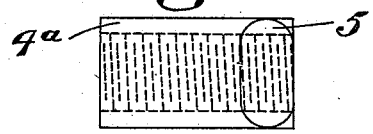
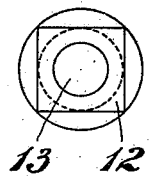 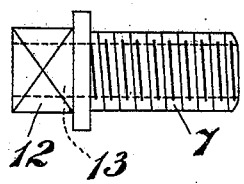 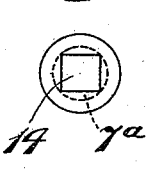 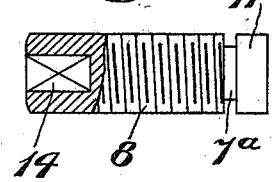
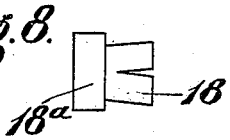
Witnesses
Emory L. Groff.
R. C. Braddock.
Inventor
George Webb
per
his Attorney

UNITED STATES PATENT OFFICE.

GEORGE WEBB, OF MONMOUTH, ENGLAND.

TIRE-CARRYING RIM FOR VEHICLE-WHEELS.

997,877.

Specification of Letters Patent.

Patented July 11, 1911.

Application filed November 11, 1909. Serial No. 527,486.

*To all whom it may concern:*

Be it known that I, GEORGE WEBB, a subject of the King of Great Britain and Ireland, residing in Monmouth, England, have invented a new and useful Tire-Carrying Rim for Vehicle-Wheels, of which the following is a specification.

This invention relates to improvements in detachable tire-carrying rims of the kind described and shown in my U. S. application Serial Number 467,997 December 17th 1908.

The present invention has for its principal object to provide a detachable and divisible rim which shall be of simple and efficient construction and which shall be as easy as possible to get on and off the wheel felly all operations for this purpose being performed on the outside of the wheel.

With the detachable and divisible rims described and shown in the aforesaid application for Letters Patent and in the application for Letters Patent in the United States Serial Number 471,321 January 8th 1909, in order to jack the rim on and off the wheel felly the jacking bolts had to be manipulated on the inside of the wheel, *i. e.* the side next the body of the car, and it was necessary to revolve the wheel so that each successive jacking bolt was brought to the lowermost or nearly to the lowermost position in order to enable the spanner or other tool employed to be conveniently applied to the bolts for turning same thus causing considerable inconvenience and delay in getting the rim on and off the wheel, further the operator had to stoop down in order to get at the bolts, this being particularly objectionable on muddy roads.

With the present invention while the arrangement of bolts in each of the lugs on the inner periphery of the divided rim is the same as in the above mentioned prior specifications, yet the jacking bolts and the bolts for connecting the two parts of the rim together are so constructed as to permit of the jacking bolts being easily manipulated from the outside of the wheel felly. For this purpose the bolt or bolts by which the two parts of the rim are held together are each made tubular or provided with a longitudinal passage, and the inner end of each of the jacking bolts is so formed that it can be engaged by one end of a suitable key or tool adapted to be passed in through the other hollow or tubular bolt (by which the two parts of the rim are connected together), the other end of this key or tool being provided with a rectangular or other suitably shaped head or nut adapted to be operated by means of an ordinary box spanner, or other suitable means, for the purpose of turning the said key or tool so as to turn the jacking screw in one direction or the other for respectively moving the rim on to and pushing it off the wheel felly.

The accompanying drawing illustrates the invention.

Figure 1 is a transverse section of a detachable rim constructed in accordance with this invention. Fig. 2 shows a form of the key or tool for operating the jacking bolts. Fig. 3 is a plan view of part of one of the bosses or projections on the inner periphery of the rim. Figs. 4 and 5 are respectively an end and a side view of one of the bolts for connecting the two parts of the rim together. Figs. 6 and 7 are respectively an end view and a side view (the latter partly in section) of one of the jacking bolts by which the rim is forced on to and off the wheel. Fig. 8 shows a form of plug or cover for the outer ends of the tubular bolts that connect the two parts of the rim together.

Like reference numbers indicate corresponding parts in the several figures of the drawing.

1 is the permanent felly of the wheel the outer periphery of which is beveled or coned, 2 the metal bonding band fixed on the felly 1, and 3, 3ª the two parts of the circumferentially divided tire carrying rim; 4, 4ª are the two parts of one of the bosses or projections on the inner periphery of the rim. The part 4ª is provided with an upward projection 5 engaging in a correspondingly formed hole in the rim part 3ª, this method of connecting the bosses to the tire-carrying rim being the same as described and shown in the complete specification filed in connection with my U. S. application for Letters Patent Serial Number 467,997 December 17th, 1908. The parts 4, 4ª constituting the boss on the inner periphery of the tire carrying rim are bored out to receive the bolts 7 and 8 the part 4 having a plain bore, while the bore of the part 4ª is provided with a screw thread with which the threads on the bolts 7 and 8 engage.

The part 4 of the boss is, through its upwardly projecting part 9, connected to the part 3 of the rim by rivets, or otherwise as may be desired.

10 is the slotted locking plate (preferably in the form of a ring extending around the inside of the wheel felly 1 and suitably secured thereto) the reduced part or neck 7ª of the jacking bolt 8 engaging in the vertical slot 10ª in this plate.

11 is the head, which may be circular, on the outer end of the bolt 8 this head engaging on the outside of the plate 10 while the shoulder at the outer end of the threaded part of the bolt 8 engages on the inside of the plate 10.

The bolt 7 is provided with a rectangular or other suitably shaped head 12 whereby the bolt can be turned by means of a wrench or spanner.

It will be understood that a desired number of the bosses consisting of the parts 4, 4ª,—for example 4 or more as may be desired,—are provided at intervals on the inner periphery of the tire carrying rim 3, 3ª, the felly 1 being provided with a corresponding number of transverse recesses and the bonding band 2 with coinciding slots for the reception of the said bosses.

As hereinbefore mentioned each of the bolts 7 is, according to the present invention, made tubular, 13 being the passage through the bolt, and the inner end of each of the jacking bolts 8 is so formed that it can be engaged by a suitable key or tool whereby the said jacking bolts can be operated; in the example shown a rectangular recess 14 is provided in the inner end of the jacking bolt 8 with which recess the correspondingly formed end 15 of the key or tool 16 (Fig. 2) is adapted to be engaged, 17 being a rectangular head on the tool 16 adapted to be engaged by a suitable spanner or wrench. The part 15 of the tool 16 is preferably beveled on its sides as indicated at 15ª so as to facilitate its engagement with the recess 14 in the bolt 8.

18 is a plug or cap adapted to close the outer end of the passage 13 through bolt 7; this plug may be made of vulcanized fiber or other suitable material and in the example shown is adapted to be held in the passage or bore 13 by frictional engagement therewith, the plug for this purpose being partially split as shown in Fig. 8.

18ª is a head on the plug 18 the edge of which head may be milled or roughened to facilitate the withdrawal of the plug from the bolt 7.

If it is desired to disconnect the part 3 of the rim from the wheel without removing the part 3ª,—i. e. without removing the rim as a whole,—the bolts 7 are successively turned by means of a spanner or wrench until their stems are out of engagement with parts 4ª of the bosses on the rim whereupon the part 3 of the rim can be removed, the heads of the bolts being on the outside of the wheel that is on the side facing away from the body of the vehicle. If it is desired to remove the entire rim from the wheel the plugs or caps 18 are removed from the ends of the bolts 7 and the tool 16 is passed in through the passage 13 of each bolt successively, so that its end 15 engages in the recess 14 in the respective jacking bolt 8, so that upon turning the tool 16, for instance from left to right, the jacking bolt 8 will be turned so as to force the rim 3, 3ª off the wheel. To replace the rim or to place a spare rim with a new tire on the wheel the rim is slipped on to the felly far enough for the right end of the threaded bore of the parts 4ª of the bosses on the rim to engage the inner ends of the jacking bolts whereupon the tool 16 is passed in through each of the bolts 7 in turn, so that its end 15 engages with the recess 14 in the respective jacking bolts so that upon turning the tool 16 say from right to left the rim will be forced fully home on the coned face of the bonding band on the felly 1.

What I claim as my invention, and desire to secure as Letters Patent is:—

In a tire carrying rim for wheels, the combination with the permanent felly, of a sectional detachable rim consisting of separate tire engaging members, each of which is provided with a boss, one of the bosses being threaded and the other having a plain bore, a jacking bolt mounted at one side of the felly and engaging the threaded boss and having an engaging element for a tool at one end, and a fastening screw mounted at the opposite side of the felly and engaging both of said bosses, said fastening screw being hollow to permit the insertion therethrough of a tool to engage the said element at the end of the jacking bolt.

GEORGE WEBB.

Witnesses:
J. GROOM,
W. H. SINSON.